Jan. 5, 1926.  1,568,619

E. B. PHELPS

PROPORTIONAL FLOW DEVICE

Filed August 7, 1922  2 Sheets-Sheet 1

Inventor
Earle B. Phelps,
By Dodge and Sons
Attorneys

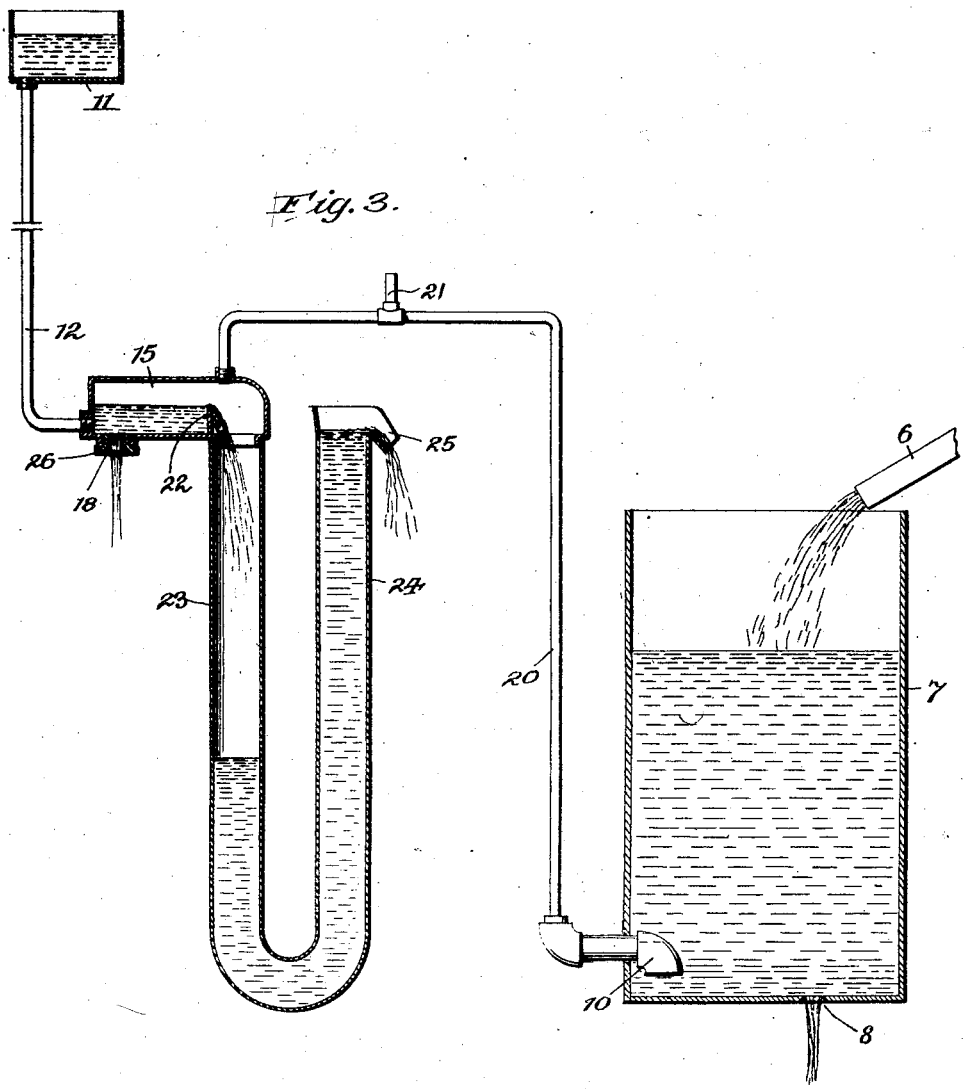

Patented Jan. 5, 1926.

1,568,619

UNITED STATES PATENT OFFICE.

EARLE BERNARD PHELPS, OF RIDGEWOOD, NEW JERSEY.

PROPORTIONAL-FLOW DEVICE.

Application filed August 7, 1922. Serial No. 580,230.

*To all whom it may concern:*

Be it known that I, EARLE B. PHELPS, a citizen of the United States, residing at Ridgewood, in the county of Bergen and State of New Jersey, have invented certain new and useful Improvements in Proportional-Flow Devices, of which the following is a specification.

This invention relates to hydraulic measuring devices and particularly to automatic means for producing proportional flow of two streams of liquid, subject to independent changes of head and having either the same or different specific gravities.

Devices of this character are useful in a number of industrial operations where it is desirable to add a small stream of some chemical solution to a larger stream of some liquid, maintaining a constant rate or proportion. As an example of such operations I may mention the process of purifying water by adding a solution of sulphate of alumina.

The invention offers a simple means of automatic control actuated solely by hydraulic head, and, in the preferred form susceptible of adjustment to vary the proportional rate. Stated in its simplest terms the invention involves the use of two measuring devices having the same flow law or formula, for example two fixed orifices, or two weirs of the same type, and the automatic control of the head on one measuring device by the varying head on the other.

In the drawings:—

Fig. 3 shows a refinement of the structure of Fig. 1, having certain features adapting it for commercial use.

Figure 1:
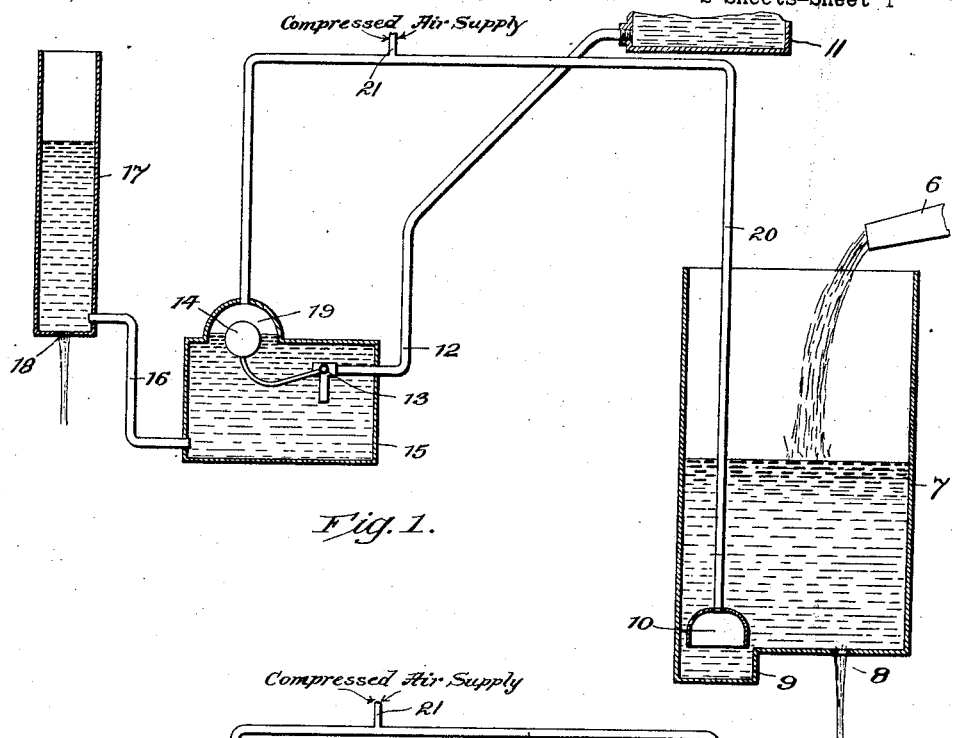
Fig. 1 shows a simple embodiment of the inventive principle involving the use of fixed orifices.

Referring first to Fig. 1, the source of the main or controlling stream, whose flow rate may be widely variable, is indicated by the pipe 6. The pipe 6 discharges into a tank 7 having the fixed orifice 8 in its bottom. The tank 7 has a well 9 in its bottom to permit a bell 10 to be submerged in the tank with its lower margin at the level of the defining edge of orifice 8.

The source of the controlled stream is the tank 11 which communicates through a pipe 12 and regulative valve 13, controlled by a ball float 14, with a closed pressure controlling chamber 15. The chamber 15 communicates through a pipe 16, with a variable head tank 17 and in the bottom of tank 17 is a fixed orifice 18 similar in form to but usually smaller in size than the orifice 8. The tank 17 is shown open to the atmosphere and in such case the total head on orifice 18 is the static head due to the height of the liquid in the tank. If the tank 17 were closed at its top with a confined body of air above the liquid, the total head on orifice 18 would be the static head due to the height of the liquid plus the pressure head due to the compression of the confined air. As is well known the total head is the same in these two cases.

In order that the total head on orifice 18 shall be kept equal, or approximately equal, to the head on orifice 8 the ball float 14 works beneath a dome 19, on top of chamber 15, connected by an air-filled pipe 20 with the bell 10, and the float 14 is so adjusted relatively to valve 13 as to open the valve whenever the liquid level under the dome falls below the level of the defining edge of orifice 18. Hence the total heads on the orifices 8 and 18 are balanced one against the other by the air pressure communicated by pipe 20 between bell 10 and dome 19.

To avoid errors incident to the entrance of liquid into bell 10 under increases of head in tank 7 and also those necessarily occasioned by changes of temperature and air leakage, it is practically desirable to feed air to the air line. This I do through a pipe 21 connected to pipe 20. The air is constantly supplied at a slow rate under a pressure slightly greater than that corresponding to the maximum static head in tank 7. This keeps the air line full of air at all times and excess air escapes around the lower edge of bell 10.

Consequently the heads on the orifices 8 and 18 are maintained equal at all times. Since the rate of flow through an orifice varies as the square root of the head, the flows through the two orifices vary at equal rates, maintaining a constant proportion which is fixed by choosing the relative sizes of orifices 8 and 18.

Figure 2:
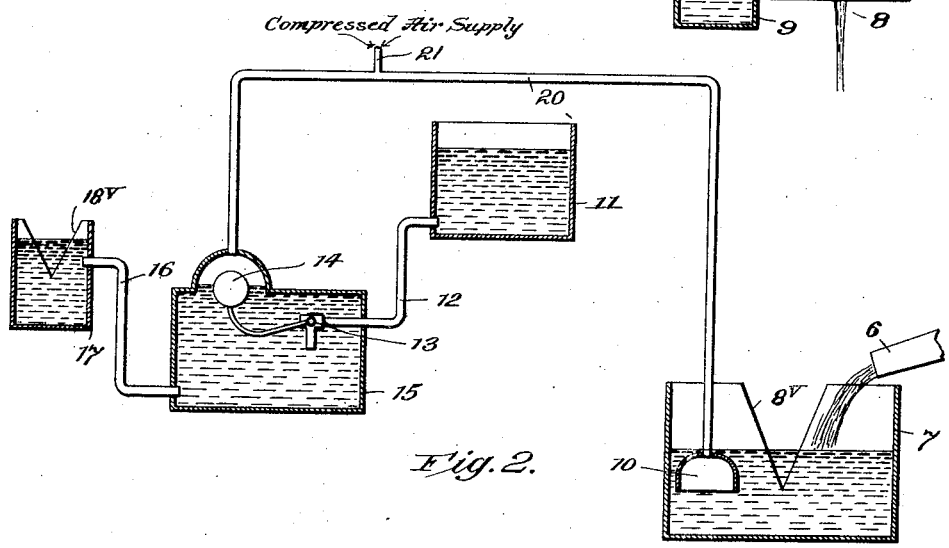
Fig. 2 illustrates the substitution of V-notch weirs for the orifices used in the structure of Fig. 1.

In Fig. 2 is illustrated a device differing from that of Fig. 1 only in the substitution of V-notch wiers $8^V$ and $18^V$ for the orifices 8 and 18, respectively. Other parts are identical with those illustrated in Fig. 1 and are similarly numbered. It should be noted that the bottom or apex of the weir notch 8^V is level with the margin of bell 10 and the apex of notch 18^V is at the level maintained under dome 19 by float 14 and valve 13.

In the case of V-notch weirs the rate of flow varies as the $\frac{5}{2}$ power of the head so that proportional flow of the two liquids is secured.

In Fig. 3 I show a device in which I eliminate the regulative valve 13. The function of this valve in Fig. 1 is to vary the quantity of liquid supplied to the variable head tank 17 so as to maintain in this tank a static head equal to the pressure head exerted by the air. In the structure of Fig. 3 there is no variable head tank and the pressure head exerted by the air directly determines the rate of outflow through the controlled orifice. The excess above such outflow discharges through an overflow and may be disposed of as desired. Usually it would be pumped back to the source.

The device of Fig. 3 is fundamentally identical with that of Fig. 1 and the functionally identical parts in the two structures are identified by the same reference numeral.

The pipe 6 is the supply of the main or controlling liquid, and discharges into a tank 7 having a fixed orifice 8 in its bottom. The bell 10, here shown as an elbow connection with its end turned down, is mounted a short distance above the defining edge of the orifice 8. The purpose of so mounting the valve will be made plain hereafter.

The source of the controlled liquid flow is the tank 11 elevated to give a static head sufficient to produce flow through the pipe 12 at least equal to, and preferably slightly exceeding, the maximum outflow through the controlled orifice 18. The pipe 12 leads to the pressure control chamber 15 and the orifice 18 is in the bottom of this chamber between the point of discharge of pipe 12 and the barrier or dam 22 whose purpose is to maintain a pool of liquid above the orifice 18 whose depth is three or more times the diameter of the orifice 18. The purpose of this is to insure sufficient submergence of the orifice 18 to stabilize the coefficient of discharge. The height of the dam 22 is made equal, or substantially equal, to the distance that the bell 10 is spaced above the defining edge of the orifice 8. The bell 10 is connected by the air pipe 20 to the control chamber 15, and air is supplied to pipe 20 through connection 21 at a pressure slightly greater than that corresponding to the maximum static head which can exist in tank 7 at the lower edge of bell 10.

The liquid entering the chamber 15 through the pipe 12 at a rate faster than the possible outflow through orifice 18 maintains a pool of liquid of approximately constant depth over the orifice 18. Such liquid as does not flow out through this orifice escapes over the dam and into a trap or manometer U tube consisting of the vertical branches 23 and 24 connected at their lower ends.

The branch 24 has an overflow 25 at its upper end arranged at, or preferably slightly below, the crest of the dam 22. The liquid overflowing from the overflow 25 may be run to waste or may be pumped back to tank 11 as heretofore suggested.

The air pressure existing in the pipe 20 is limited to a value corresponding to the static head at the lower edge of bell 10, the air escaping around the lower edge of the bell at such rate as is necessary to limit the pressure to this value. Consequently the chamber 15 is subjected to the same pressure and the liquid column in the branch 23 is depressed below the level of overflow 25 a distance equal to the submergence of the bell 10.

The effective head on the orifice 18 is the static head corresponding to the height of the dam 22 plus the pressure head exerted by the air. The effective head acting on the orifice 8 is the same, being equal to the static head acting at the mouth of the bell 10 plus the static head due to the vertical height of the orifice 8 below the bell 10, this vertical height being as heretofore stated equal to the height of the dam 22.

It will be observed, therefore, that the spacing of the bell 10 above the orifice 8 is for the purpose of compensating for the constant static head maintained on the orifice 18 by the dam 22. The device will thus operate to produce the desired proportional flow through the orifices 8 and 10 at all effective heads equal to or greater than the height of the dam 22.

The entire freedom of the device from valves, floats and similar moving parts is a very important feature, particularly where chemicals are to be fed. Thus, while the construction shown in Figs. 1 and 2 embody the inventive concept and are of practical utility, that shown in Fig. 3 is preferred for practical use.

What is claimed is:—

1. The combination of two liquid-flow measuring orifices whose flow rates are similar functions of the respective effective hydraulic heads on said orifices; independent sources of liquid for the two orifices, said sources being characterized by independent variations of hydraulic head; a closed regulative chamber associated with the second orifice and partly filled with liquid flowing to said second orifice; means for exerting pneumatic pressure on the surface of said liquid to increase the effective head on the second orifice; and controlling means for said pneumatic pressure subject to the head on said first orifice.

2. The combination of two liquid-flow measuring orifices whose flow rates are similar functions of the respective effective hydraulic heads on said orifices; independent sources of liquid for the two orifices, said sources being characterized by independent variations of hydraulic head; a closed regulative chamber associated with the second orifices and partly filled with liquid flowing to said second orifice; a bell having its bottom open and submerged in liquid flowing to said first orifice; a pneumatic pressure transmitting connection between said bell and the space above the liquid in said chamber; and means for feeding pneumatic pressure fluid to said connection at a pressure higher than the hydrostatic pressure on said bell.

3. The combination of two liquid-flow measuring passages whose flow rates are similar functions of the respective effective hydraulic heads on said passages; independent sources of liquid for the two passages, said sources being characterized by independent variations of hydraulic head, the head on the second source being always the greater; a valve controlling and urged closed by the hydrostatic head on the second measuring passage; a pneumatic pressure device urging said valve in an opening direction; and means for limiting the pneumatic pressure in said device by the hydrostatic pressure on the first passage.

4. The combination of two liquid-flow measuring passages whose flow rates are similar functions of the respective effective hydraulic heads on said passages; independent sources of liquid for the two passages; a valve subject to and urged closed by the effective hydrostatic head on the second measuring passages; a bell having its bottom open and submerged at the level of zero head on the first passage; and a pneumatic pressure transmitting connection between said bell and said valve, whereby the pressure in the bell urges said valve in an opening direction.

5. The combination of two liquid-flow measuring passages whose flow rates are similar functions of the respective effective hydraulic heads on said passages; independent sources of liquid for the two passages; a valve subject to and urged closed by the effective hydrostatic head on the second measuring passage; a bell having its bottom open and submerged at the level of zero head on the first passage; a pneumatic pressure transmitting connection between said bell and said valve, whereby the pressure in the bell urges said valve in an opening direction; and means for feeding pneumatic pressure fluid to said connection at a pressure higher than the hydrostatic pressure on said first passage.

In testimony whereof I have signed my name to this specification.

EARLE BERNARD PHELPS.